United States Patent [19]  [11]  4,368,292
Alberts et al.  [45]  Jan. 11, 1983

[54] THERMOPLASTIC MOULDING COMPOSITIONS OF COGRAFT POLYMERS OF CELLULOSE ESTERS

[75] Inventors: Heinrich Alberts, Cologne, Fed. Rep. of Germany; Winfried Fischer, Tokyo, Japan; Christian Leuschke, Dormagen, Fed. Rep. of Germany

[73] Assignee: Bayer Aktiengesellschaft, Leverkusen, Fed. Rep. of Germany

[21] Appl. No.: 330,100

[22] Filed: Dec. 14, 1981

[30] Foreign Application Priority Data

Dec. 23, 1980 [DE] Fed. Rep. of Germany ....... 3048696

[51] Int. Cl.³ .................... C08L 51/00; C08L 1/10
[52] U.S. Cl. .................................. 525/54.23; 527/314
[58] Field of Search ...................... 525/54.23; 527/314

[56] References Cited

U.S. PATENT DOCUMENTS 3,645,939  2/1972  Gaylord ........................... 525/54.23
4,255,298  3/1981  Simms ................................ 527/314
4,324,708  4/1982  Ito et al. ............................. 527/314

Primary Examiner—Lucille M. Phynes
Attorney, Agent, or Firm—Connolly and Hutz

[57] ABSTRACT

The invention relates to thermoplastic moulding compositions consisting of a graft substrate composed of (a) a (meth)acrylic acid $C_1$–$C_{18}$-alkyl ester homo- or copolymer, and (b) of a cellulose ester of one or more aliphatic $C_1$–$C_5$ carboxylic acids, and polymerized units of (2) vinyl esters and/or alkyl esters of acrylic and/or methacrylic acid and (3) of $C_2$–$C_4$-α-olefins, at least part of the (meth)acrylic acid ester polymer and of the cellulose ester being bridged together through polymerized units of the graft monomers.

5 Claims, No Drawings

THERMOPLASTIC MOULDING COMPOSITIONS OF COGRAFT POLYMERS OF CELLULOSE ESTERS

This invention relates to thermoplastic moulding compositions of cellulose esters and cograft polymers obtained by the polymerisation of vinyl monomers, in particular of unsaturated esters, in the presence of mixtures of cellulose esters and (meth)acrylic acid ester (co)polymers.

Moulding compositions containing cellulose acetate cannot be worked up thermoplastically without the addition of low molecular weight plasticizers because this ester begins to decompose before it softens. In cellulose acetopropionates and cellulose acetobutyrates, the softening point and decomposition temperature are also so close together that moulding compositions containing them must be fixed with plasticizers to produce the necessary lowering in their processing temperature and processing viscosity before they are thermoplastically processed.

The plasticizers used for organic cellulose esters are mainly aliphatic esters of phthalic acid, adipic acid, azelaic acid, sebacic acid and phosphoric acid, such as, for example, dimethyl phthalate, diethyl phthalate, dibutyl adipate, dioctyl adipate, dibutyl acetate, trichloroethyl phosphate and tributyl phosphate. It is in many cases also advantageous to use mixtures of plasticizers.

Although cellulose ester moulding compositions which have been modified with plasticizers have very good transparency, it would be desirable for some of their applications to improve their dimensional stability under heat. Furthermore, the plasticizers migrate to the surface of the moulded products in the course of time so that, for example, foils of modified cellulose esters cannot be used for packaging certain foodstuffs.

Mixtures of organic cellulose esters, low molecular weight plasticizers and olefin polymers have been disclosed in German Auslegeschrift No. 1,303,219, but these moulding compositions are no longer transparent if they contain a relatively high proportion of olefin polymers. Moreover, conventional low molecular weight esters which have well known disadvantages when used as plasticizers are used in this case.

The use of polymeric plasticizers for cellulose mixed esters is also known. Thermoplastic mixtures of 40 to 90% by weight of cellulose esters and 10 to 60% by weight of an ethylene/vinyl acetate copolymer having a vinyl acetate content of 75 to 99% by weight, which are characterised by high mechanical strength and high transparency, are described in U.S. Pat. No. 3,682,850.

Transparent thermoplastic moulding compositions of organic cellulose esters and ethylene/vinyl ester copolymers have been disclosed in German Offenlegungsschrift No. 2,426,178. The ethylene/vinyl ester copolymers used contain 30 to 98% by weight, preferably 60 to 98% by weight, of vinyl esters incorporated into the molecule.

Mixtures of cellulose mixed esters and ethylene/vinyl ester copolymers containing less than 75% by weight of vinyl esters built into the ethylene copolymer component, although generally transparent, have an increasing tendency to crazing under bending and stretching stresses with an increasing proportion by weight of ethylene/vinyl ester copolymers in the mixture. Furthermore, mixtures of (meth)acrylic acid ester homo- and copolymers with cellulose mixed esters are compatible only to a very limited extent so that, for example, moulding compositions which are soft and flexible and yet tough cannot be prepared from them.

This loss of transparency and mechanical strength is undesirable for technical applications. At the same time, the inadequate compatibility of the polymers prevents the preparation of soft, flexible moulding compositions which will preserve high transparency without crazing even under extreme bending and stretching stresses.

It has now been found that the above-mentioned disadvantages can be overcome and highly transparent tough, soft and flexible moulding compositions can be obtained on the basis of organic cellulose esters and (meth)acrylic acid ester copolymers optionally containing up to 75% by weight of built-in vinyl esters if vinyl monomers, preferably vinyl esters and acrylic esters or mixtures thereof are grafted onto mixtures of organic cellulose esters and (meth)acrylic acid ester polymers as graft substrate. Grafting also has the effect of partly or completely bridging together the polymer components of the graft substrate. It has also been found that mixtures of these cograft polymers and cellulose mixed esters have excellent compatibility and very good mechanical values.

The present invention thus provides themoplastic moulding compositions comprising
(1) 1–99% by weight, preferably 20–95% by weight, of a graft substrate composed of
  (a) 1–99% by weight, preferably 20–95% by weight, of a (meth)acrylic acid $C_1$–$C_{18}$-alkyl ester homo- or copolymer, and
  (b) 99–1% by weight, preferably 80–5% by weight, of a cellulose ester of one or more aliphatic $C_1$–$C_5$ carboxylic acids, and
(2) 99–1% by weight, preferably 85–15% by weight polymerized units of
  (a) 100–80% by weight of one or more vinyl esters and/or of one or more alkyl esters of acrylic and-/or methacrylic acid, and
  (b) 0–20% by weight of one or more $C_2$–$C_4$-α-olefins, at least part of the (meth)acrylic acid ester (co)-polymer and of the cellulose ester being bridged together through polymerised units of the graft monomers, and the sum of components (1)–(2) and of components (a) and (b) being in each case 100% by weight.

The invention also provides thermoplastic moulding compositions comprising
(I) 1 to 99% by weight, preferably 50 to 99% by weight, of a cellulose ester of one or more aliphatic $C_1$–$C_5$ carboxylic acids, and
(II) 99 to 1% by weight, preferably 50 to 1% by weight, of a cograft polymer of
  (1) 1 to 99% by weight, preferably 15 to 85% by weight, of a graft substrate composed of
    (a) 1 to 99% by weight, preferably 20–95% by weight, of a (meth)acrylic acid $C_1$–$C_{18}$-alkyl ester homo- or copolymer, and
    (b) 99 to 1% by weight, preferably 80 to 5% by weight, of a cellulose ester of one or more aliphatic $C_1$–$C_5$ carboxylic acids, and
  (2) 99–1% by weight, preferably 85–15% by weight, polymerized units of
    (a) 100 to 80% by weight of one or more vinyl esters and/or of one or more alkyl esters of acrylic and/or methacrylic acid, and
    (b) 0–20% by weight of one or more $C_2$–$C_4$ α-olefins, at least part of the (meth)acrylic acid ester (co)polymer and of the cellulose ester being bridged together through polymerised units of the graft monomer, and the sum of components (I) and (II), of components (1)-(2) and of components (a) and (b) being in each case 100% by weight.

Suitable cellulose esters for the preparation of the moulding compositions according to the invention are cellulose esters of aliphatic carboxylic acids having 1 to 5 C-atoms, preferably cellulose acetate, acetoprionate and acetobutyrate.

Processes for the preparation of organic cellulose esters have long been known and are described, for example, in Ullmanns Encyklopadie der technischen Chemie (publishers Urban and Schwarzenberg, Munchen-Berlin 1963 in volume 5, on pages 182 to 201).

Preferred cellulose acetobutyrates contain
40–50% by weight of butyric acid groups and
15–26% by weight of acetic acid groups.

Cellulose acetobutyrates having the following composition are particularly preferred for the moulding compositions according to the invention:
42–46% by weight of butyric acid groups and
18–22% by weight of acetic acid groups.

Preferred cellulose acetopropionates generally contain
50 to 66% by weight of propionic acid groups and
1 to 12% by weight of acetic acid groups,
and particularly preferred cellulose acetopropionates have the following composition:
54 to 66% by weight of propionic acid groups and
4 to 9% by weight of acetic acid groups.

Among the cellulose acetates, secondary cellulose acetates are preferably used.

Preparation of the graft bases to be used according to the invention, based on (meth)acrylic acid ester copolymers, is carried out by known methods in the usual manner. The (meth)acrylic acid ester copolymers may be cross-linked or not and they generally have glass transition temperatures below 0° C., preferably below −20° C., in particular below −30° C. The glass transition temperature of (meth)acrylic acid ester polymers may be determined by, for example, the DSC method (K. H. Illers, Makromol Chemie 127 (1969) page 1).

The polymers may be prepared from (meth)acrylic acid alkyl esters having 1 to 18 C-atoms, preferably 4 to 8 C-atoms, in the alkyl group. Acrylic acid-n-butyl ester and acrylic acid-2-ethyl hexyl ester should be particularly mentioned. For the preparation of the (meth)acrylic acid ester polymers used as the graft base, the (meth)acrylic acid esters may be used singly or as mixtures. Copolymers with other vinyl monomers may also be used as the graft base instead of (meth)acrylic acid ester (co)polymers. Particularly suitable vinyl monomers include vinyl esters, vinyl ethers, vinyl halides and aromatic vinyl compounds. The following may be particularly mentioned: vinyl acetate, vinyl adipate and vinyl stearate as examples of vinyl esters; $C_1$–$C_{18}$ alkyl vinyl ethers, in particular ethyl-, n-butyl- and 2-ethyl hexyl-vinyl ethers, vinyl chloride, vinyl fluoride and vinylidene fluoride, styrene and α-methyl styrene. Copolymers with (meth)acrylonitrile and (meth)acrylic acid may also be used as the graft base if desired. The copolymers of (meth)acrylic acid esters with $C_2$–$C_6$ α-olefins and dienes, which may be obtained by special processes, are also suitable. Ethylene is a particlarly suitable α-olefin, and butadiene and isoprene are used as dienes. Soluble copolymers are prepared in known solvents, preferably alcohols, or solvent-free; cross-linked copolymers are preferably prepared in emulsion.

Cross-linked (meth)acrylic acid ester polymers may be obtained, for example, by the processes described in German Pat. No. 1,260,135 and German Offenlegungsschrift No. 2,826,925.

The vinyl esters used for the preparation of the cograft polymers may be organic vinyl esters of saturated, optionally halogen-substituted, in particular chloro-substituted, aliphatic monocarboxylic acids having 1–18 C-atoms or aromatic monocarboxylic acids having 7–11 C-atoms. The following are specific examples: vinyl formate, vinyl acetate, vinyl propionate, vinyl chloropropionate, vinyl butyrate, vinyl isobutyrate, vinyl caproate, vinyl laurate, vinyl myristate, vinyl stearate and vinyl benzoate; vinyl acetate is preferred.

Ethylene (meth)acrylic acid ester copolymers prepared by the process of high pressure synthesis have melt index values according to DIN 53 735 at 190° C. under a load of 2.16 kp in the range of 0.1 to 1,000, preferably 1.0 to 20. The intrinsic viscosities determined in tetralin at 120° C. are generally in the region of 0.1 to 1.5 [dl/g]. The molecular weights determined by the method of light scattering are preferably from 2,500 to 1 million. The non-uniformity U defined by the relationship $M_w/M_n - 1$ (G. Schulz, Z. phys. Chem. (B) 43 (1939) pages 25 to 34) is in the region of 1 to 30. These copolymers are soluble in hydrocarbons, alcohols or esters.

(Meth)acrylic acid $C_1$–$C_{18}$-alkyl ester copolymers prepared, for example, by the method of solution or emulsion polymerisation have melt index values (190° C.–2.16 kp) which may be greater than 100 but they are preferably below 35. The molecular weights determined by light scattering are preferably from 4,000 to 1 million. The non-uniformity U is generally from 1 to 15. The copolymers are soluble in hydrocarbons, alcohols and esters and preferably have intrinsic viscosities η in the range of 0.5 to 2.5 [dl/g] in toluene.

The monomers used for the preparation of the cograft polymers are primarily vinyl esters and/or alkyl esters of (meth)acrylic acid. It is suitable to use $C_1$–$C_{14}$, particularly $C_1$–$C_4$ alkyl esters of acrylic and/or methacrylic acid, such as methyl (meth)acrylate, ethyl (meth)acrylate, n-propyl and isopropyl (meth)acrylate, n-butyl and isobutyl (meth)acrylate and 2-ethylhexyl (meth)acrylate. Suitable vinyl esters include the vinyl esters of aliphatic or aromatic monocarboxylic acids already described above, particularly vinyl acetate.

Other suitable monomers include $C_2$–$C_4$ α-olefins such as ethylene, propylene and isobutylene and in some cases acrylic acid and methacrylic acid.

Aromatic vinyl compounds such as styrene or α-methyl styrene may be used if the cograft polymers are not required to be transparent. These aromatic compounds may also be used in admixture with (meth)acrylic esters if desired.

Graft polymerisation is carried out in solution or solvent-free. The following are suitable solvents: hydrocarbons such as benzene, toluene, xylene; alcohols such as methanol, ethanol, propanol, isopropanol, n-butanol, tertiary butanol; chlorinated hydrocarbons such as chlorobenzene, methylene chloride, tetrachloroethylene; esters such as methyl, ethyl or butyl acetate, and glacial acetic acid or mixtures of these solvents.

The graft substrates may be dissolved in known manner in selected solvents. The solution of one graft substrate may, of course, first be prepared if desired, and the second polymer may then be dissolved in this solution or in any solvent which is miscible with the first solvent, and the two mixtures may then be combined and the resulting homogeneous solution used for the grafting reaction. Graft polymerisation is preferably carried out in a homogeneous phase but may in principle also be carried out as a heterogeneous phase reaction. One could equally well first prepare a homogeneous phase of graft substrate, vinyl monomers and optionally solvents, disperse the solution in water and then polymerise, optionally after addition of a catalyst. Polymerisation may be carried out continuously or batch-wise.

The grafting reaction may be carried out in polymerisation screws with or without solvents, and the solvent, if used, or the residual monomer may be removed from the graft polymerisation mixture by evaporation in evaporator screws, thin layer evaporators or spray driers, Polymerisation is generally carried out at temperatures of from $-20°$ C. to $250°$ C., preferably from $30°$ C. to $180°$ C., and at pressures of from normal pressure to 300 bar, preferably up to 25 bar.

The polymerisation catalysts may be added to the polymerisation mixture before, during or after the process of dissolving or mixing. They are preferably introduced into the reaction mixture after preparation of the homogeneous graft substrate solution, either together with the monomers or separately therefrom.

The polymerisation catalysts are advantageously used in a quantity of from 0.001 to 2% by weight, based on the sum of graft substrate and graft monomer. The quantity used may, of course, lie far outside these limits.

The polymerisation catalysts used may be per-compounds or azo-compounds or highly substituted ethane derivatives which yield radicals, e.g. benzopinacol. The following are examples: benzoyl peroxide, tertiary butyl perpivalate, lauroyl peroxide, tertiary butyl peroctoate, tertiary butyl perbenzoate, ditertiary butyl peroxide, tertiary butyl perisononanate, diisopropyl percarbonate, dicyclohexyl percarbonate, dicumyl peroxide, tertiary butyl perneodecanoate, azo-bis-isobutyric acid nitrile or esters of azo-bis-isobutyric acid, such as bisethyl esters.

Initiator radicals may also be produced from known Redox systems or with the aid of UV radiation, actinic light or accelerated electrons.

The monomers used for polymerisation are grafted both on the cellulose esters and on the (meth)acrylic acid ester (co)polymer to form cograft polymers which are cross-bridged through polymerised units of the monomers. This cross-bridging has been proved on the basis of polymer analytical investigations of the graft polymers (see Example 1 in the experimental part).

This novel cross-bonding of the starting polymers which normally tend to separate accounts for the exceptionally good compatibility of the cograft polymers.

Preparation of the mixtures may be carried out by known methods of preparing a solution and working up the solution by precipitation and drying or by evaporation of the solvent using evaporator screws, thin layer evaporators, evaporator coils or spray driers. The mixtures may also be prepared solvent-free, using rollers, screws or kneaders.

The moulding compositions according to the invention may optionally be modified with low molecular weight plasticizers.

Suitable low molecular weight plasticizers include dimethyl phthalate, diethyl phthalate, triphenyl phosphate, methylene glycol phthalate, di-n-butyl sebacate, ethyl-butylene glycol phthalate, butyl-butylene glycol phthalate, dibutyl phthalate, dioctyl adipate, dioctyl phthalate, butyl-benzyl phthalate and triacetine.

The moulding compositions according to the invention may also contain additives, for example to colour or pigment the polymer mixtures, improve their resistance to oxidation or light or reduce their flammability.

The moulding compositions according to the invention of cograft polymers of (meth)acrylic acid ester copolymers and organic cellulose esters and/or mixtures thereof with organic cellulose esters show a remarkable increase in notched impact strength determined according to DIN 53 453. They are also distinguished by improved dimensional stability to heat as determined, for example, according to DIN 53 460 at Vicat softening temperature. The Vicat softening temperatures have values up to $50°$ C. higher than the softening temperatures of cellulose esters which are modified with low molecular weight plasticizers.

Compared with these conventional cellulose ester moulding compositions, the moulding compositions according to the invention also have improved mechanical properties such as, for example, increased hardness, tensile strength, flexural strength, modulus of elasticity and low temperature impact strength.

The well known effect of so-called plasticizer migration does not occur in the cograft polymers of organic cellulose esters, (meth)acrylic acid ester homo- and copolymers and vinyl monomers and their mixtures with organic cellulose esters, so that such moulding compositions are also particularly suitable, for example, for applications in which they come into contact with foodstuffs.

The polymer compositions according to the invention of cograft polymers of organic cellulose esters, (meth)acrylic acid ester (co)polymers and vinyl monomers and their mixtures with organic cellulose esters can easily be worked up in known extruders and injection moulding machines either continuously or batch-wise and are found to have good flow properties under these conditions.

Moulded products of any type may be produced, as well as acetate silk, block acetate, foil supports for safety films, electrically insulating foils and lacquers.

The improved resistance of the products to hot air and aging enables them to be used for outdoor applications.

The following Examples illustrate the invention. Percentages refer in all cases to weight.

PREPARATION OF THE COGRAFT POLYMERS

EXAMPLE 1

A solution of 2.6 kg of a commercial polyethyl acrylate rubber, 2.6 kg of a cellulose acetobutyrate containing 45% by weight of butyric acid groups and 19% by weight of acetic acid groups, 20.8 kg of tertiary butanol and 2.6 kg of vinyl acetate is heated to $115°$ C. under nitrogen in a 40 liter autoclave with stirrer. A solution of 2.6 kg of tertiary butanol, 2.6 kg of vinyl acetate and 20 g of benzoyl peroxide is added in the course of 3 hours while the reaction temperature is maintained constant at $115°$ C. The reaction mixture is then stirred for a further 3 hours, 20 g of 2,6-ditertiary butyl-4-methyl phenol are added to the homogeneous solution obtained, and the product is worked up in an evaporator screw.

8.4 kg of a cograft polymer having the following composition are obtained:
47.4% by weight of polymerised units of vinyl acetate,
26.3% by weight of acrylate rubber, and
26.3% by weight of cellulose acetobutyrate.
The intrinsic viscosity $\eta = 1.34$ [dl/g].

A pressed plate produced from the graft polymer at 170° C. and a moulding pressure of 200 bar is highly transparent, soft and flexible and shows no signs of crazing when subjected to stretching.

By fractionating with liquids which tend to separate into their components (See R. Kuhn, Makromol. Chem. 177 (1976) 1525-1547), the product was analysed to elucidate the graft polymer structure. According to this analysis, about 80 to 85% by weight of the vinyl acetate put into the process are grafted on the two polymers and approximately 60-62% by weight of the cellulose ester put into the process are linked in a cross-bridged ("coupled") form with the acrylate rubber through vinyl acetate bridges.

The cograft polymers shown in Table 1, having the composition indicated there, were prepared by the method described in Example 1.

TABLE 1

| Example | % by weight cellulose acetobutyrate | % by weight cellulose acetopropionate | % by weight acrylate rubber | vinyl acetate | ethyl acrylate | n-butyl acrylate | Intrinsic viscosity $[\eta]$ dl/g |
|---|---|---|---|---|---|---|---|
| 2 | — | 27.8 | 27.8 | 44.4 | — | — | 1.58 |
| 3 | 16.8 | — | 33.5 | 49.7 | — | — | 1.45 |
| 4 | — | 16.8 | 33.5 | 49.7 | — | — | 1.47 |
| 5 | 27.3 | — | 27.3 | — | 45.4 | — | 1.60 |
| 6 | — | 26.8 | 26.8 | — | 46.4 | — | 1.65 |
| 7 | 37.5 | — | 12.5 | — | — | 50 | 1.23 |
| 8 | 38.2 | — | 24.5 | 18.5 | — | 18.8 | 1.15 |

PREPARATION OF THE MOULDING COMPOSITIONS

EXAMPLES 9 to 17

Cellulose acetobutyrate containing 45% of butyric acid groups and 19% of acetic acid groups is vigorously mixed at 170° C. with the quantities of cograft polymers indicated in Table 2, using mixing rollers. The sum of the two components is 100%.

The rolled sheets are granulated and then extruded from an injection moulding machine to form test samples at a mass temperature of 230° C.

The abbreviations in Table 2 have the following meaning:
$a_n$ = impact strength according to DIN 53 453 kJ/m$^2$
$a_k$ = notched impact strength according to DIN 53 453 kJ/m$^2$
Vicat = softening temperature in °C. in accordance with DIN 53 460, process B, force 49.05 NJ
$H_k^{30}$ = ball indentation hardness after 30 sec according to DIN 53 456 in N/mm$^2$.

TABLE 2

| Example | cograft polymer | [%][a] | $a_n$[kJ/m$^2$] room temperature | −40° C. | $a_k$[kJ/m$^2$] | Vicat [°C.] | $H_k^{30}$[N/mm$^2$] |
|---|---|---|---|---|---|---|---|
| 9 | 1 | 10 | undamaged | 85 | 4.2 | 97 | 76.8 |
| 10 | 2 | 10 | undamaged | 76 | 4.0 | 96 | 75.6 |
| 11 | 3 | 10 | undamaged | 53 | 3.2 | 96 | 77.2 |
| 12 | 4 | 10 | undamaged | 82 | 3.6 | 94 | 76.4 |
| 13 | 5 | 10 | undamaged | 67 | 4.1 | 96 | 71.5 |
| 14 | 6 | 10 | undamaged | 54 | 4.1 | 96 | 71.8 |
| 15 | 7 | 10 | undamaged | 45 | 6.5 | 94 | 73.2 |
| 16 | 8 | 10 | undamaged | 75 | 6.2 | 97 | 72.2 |
| 17 | 8 | 20 | undamaged | 82 | 12.5 | 86 | 66.4 |

[a] Based on polymer mixture.

We claim:
1. Thermoplastic moulding compositions consisting of
(1) 1–99% by weight of a graft substrate composed of
   (a) 1–99% by weight of a (meth)acrylic acid $C_1$–$C_{18}$-alkyl ester homo- or copolymer, and
   (b) 99–1% by weight of a cellulose ester of one or more aliphatic $C_1$–$C_5$ carboxylic acids, and
(2) 99–1% by weight polymerized units of
   (a) 100–80% by weight of vinyl esters and/or alkyl esters of acrylic and/or methacrylic acid, and
   (b) 0–20% by weight of $C_2$–$C_4$-α-olefins,
at least part of the (meth)acrylic acid ester polymer and of the cellulose ester being bridged together through polymerized units of the graft monomers, and the sum of components (1)–(2) and of components (a) and (b) being in each case 100% by weight.

2. Thermoplastic moulding compositions according to claim 1, consisting of
(1) 1–99% by weight of a graft substrate composed of
   (a) 1–99% by weight of a (meth)acrylic acid ester homo- or copolymer, and
   (b) 99–1% by weight of a cellulose ester of one or more aliphatic $C_1$–$C_5$ carboxylic acids, and
(2) 99–1% by weight polymerized units of
   (a) 100–80% by weight of vinyl acetate and/or $C_1$–$C_4$ alkyl esters of acrylic and/or methacrylic acid, and
   (b) 0–20% by weight of $C_2$–$C_4$-α-olefins,
the sum of components (1)–(2) and of components (a) and (b) being in each case 100% by weight.

3. Thermoplastic moulding compositions according to claims 1 or 2, consisting of
(1) 15–85% by weight of a graft substrate composed of
   (a) 20–95% by weight of a (meth)acrylic acid ester homo- or copolymer, and
   (b) 80–5% by weight of a cellulose ester of one or more aliphatic $C_1$–$C_5$ carboxylic acids, and
(2) 85–15% by weight polymerized units of
   (a) 100–80% by weight of vinyl acetate and/or $C_1$–$C_4$ alkyl esters of acrylic and/or methacrylic acid, and
   (b) 0–20% by weight of $C_2$–$C_4$-α-olefins,
the sum of components (1)–(2) and of components (a) and (b) being in each case 100% by weight.

4. Thermoplastic moulding compositions according to claims 1, 2 or 3, containing, as component 1(b), cellulose acetobutyrate, cellulose acetopropionate, cellulose acetate or mixtures thereof.

5. Thermoplastic moulding compositions consisting of
(I) 1 to 99% by weight, preferably 50 to 99% by weight, of a cellulose ester of one or more aliphatic $C_1-C_5$ carboxylic acids, and
(II) 99 to 1% by weight, preferably 50 to 1% by weight, of a cograft polymer of
  (1) 1 to 99% by weight, preferably 15 to 85% by weight, of a graft substrate composed of
    (a) 1–99% by weight, preferably 20–95% by weight, of a (meth)acrylic acid $C_1-C_{18}$-alkyl ester homo- or copolymer, and
    (b) 99–1% by weight, preferably 80–5% by weight, of a cellulose ester of one or more aliphatic $C_1-C_5$ carboxylic acid, and
  (2) 99–1% by weight, preferably 85–15% by weight, polymerized units of
    (a) 100–80% by weight of vinyl esters and/or alkyl esters of acrylic and/or methacrylic acid, and
    (b) 0–20% by weight of $C_2-C_4$-α-olefins, at least part of the (meth)acrylic acid ester copolymer and
of the cellulose ester being bridged together through polymerised units of the graft monomers, and the sum of components (I) and (II), of components (1) to (2) and of components (a) and (b) being in each case 100% by weight.

* * * * *